Aug. 30, 1938.  M. SURJANINOFF  2,128,544
ELECTRIC MOTOR
Filed June 29, 1937
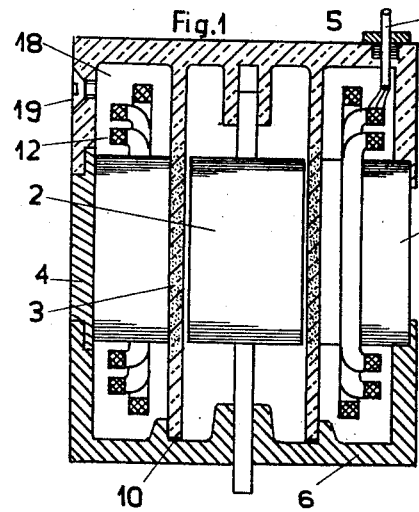
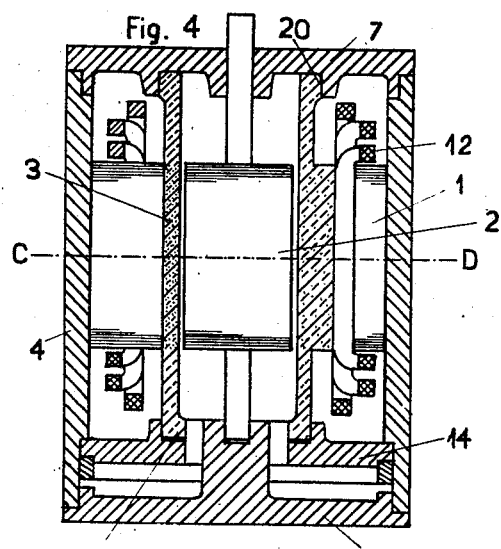
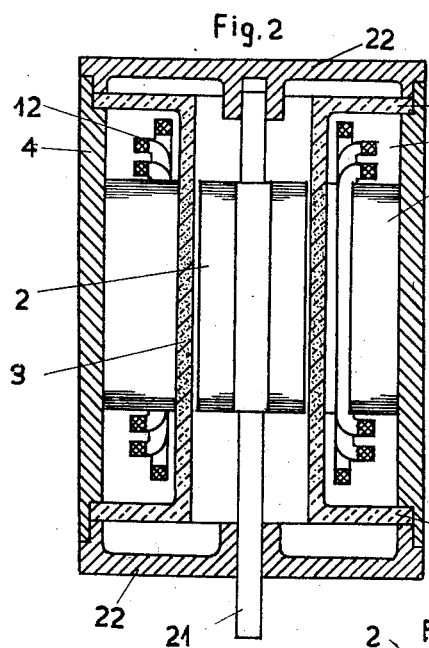
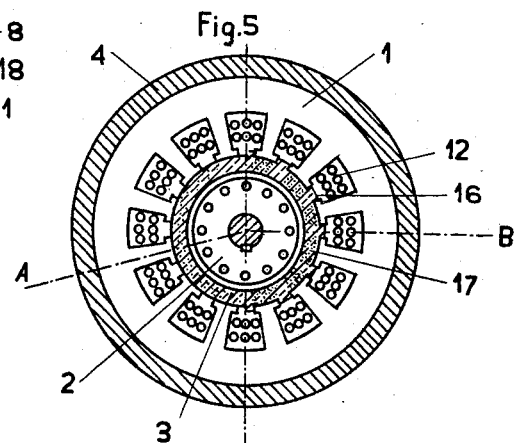
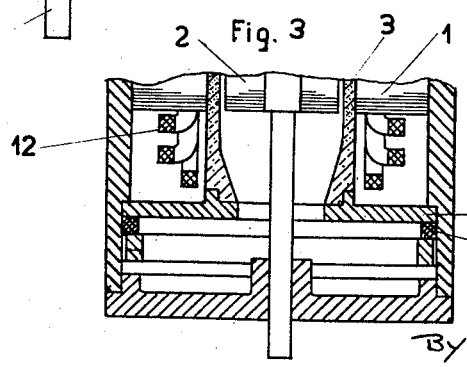
INVENTOR
ATTY.

Patented Aug. 30, 1938

2,128,544

UNITED STATES PATENT OFFICE 2,128,544

ELECTRIC MOTOR

Michael Surjaninoff, Stammersdorf, near Vienna, Austria

Application June 29, 1937, Serial No. 150,996
In Austria October 14, 1936

16 Claims. (Cl. 171—252)

My invention relates to electric motors of the type wherein the chamber enclosing the stator with its winding is separated, from the chamber enclosing the rotor, by a bush or sleeve which hereinafter will be called the gap-sleeve, and wherein the stator with its winding is surrounded by and hermetically sealed within a gas-tight or liquid-tight enclosure, whereas the rotor which is an induction rotor, preferably of the squirrel-cage type, and which is rotatably mounted within a hollow space or bore formed by the wall of the stator chamber, is submerged in a liquid or surrounded by a gas, which is not identical with that contained within the stator chamber.

Serious difficulties have been encountered with gap-sleeves because their thickness must be very small. If made of insulating material their strength will be insufficient to meet the requirements. If however the gap-sleeve is made of metal the motor will suffer from additional eddy-current losses which mean poor efficiency and efficacious water cooling will be needed.

In order to reduce losses it has been proposed to construct the gap-sleeve by piling up sheet-iron rings spaced apart by insulating sheets. Exceedingly careful work is required in manufacturing motors of this type in which the iron sheets are permanently forced together under strong pressure and in which even a very small quantity of dirt upon the jointing surfaces is capable of seriously impairing the tightness of the enclosure surrounding the stator with its winding.

An object of my invention is to provide a motor of the above mentioned type with a gap-sleeve having sufficient strength, and which is impermeable and which causes small eddy-current losses.

According to my invention the gap-sleeve consists of a mixture of finely divided magnetic material with an insulating binder, and this mixture is fashioned by moulding or by pressing after having been subjected to appropriate chemical or mechanical treatment, or both, so as to form a compact and solid body. The magnetic field in the gap between the stator and the rotor which penetrates this sleeve, then will rotate without causing substantial eddy-current losses.

Another object of my invention is to further improve the electromagnetic properties of a motor of the above mentioned type and to obtain a similar performance as would be the case if the teeth of the stator were elongated to extend across the gap-sleeve.

According to my invention the magnetic material, such as iron powder or the like is substantially arranged only in the parts of the gap-sleeve which are situated opposite the teeth of the iron core of the stator. Accordingly, the permeability of the gap-sleeve is variable throughout its circumference.

Although the slots are closed by the gap-sleeve, a motor built on these lines will work in every respect like a motor with semi-open slots.

A further object of my invention is to reduce the coilhead leakage-flux of motors having an iron containing gap-sleeve. No or practically no magnetic material is arranged in the gap-sleeve where it extends outside of the stator bore. According to my invention the percentage of magnetic material and therefore the permeability of the gap-sleeve is variable over its length.

The gap-sleeve may be sufficiently enlarged at the front ends of the stator so as to easily obtain a good seal, whereas heretofore serious difficulties of this character have been encountered with present types of motors fitted with gap-sleeves. This enlarged gap-sleeve specially lends itself to motors which are subjected to the influence of iron corroding gases and liquids, the iron core and its teeth at the surface of the bore being protected by the gap-sleeve.

With these and other objects in view the invention consists in the construction and novel combination and arrangement of parts, hereinafter more fully described, illustrated in the accompanying drawing, and pointed out in the claims hereto appended.

Referring to the sheet of drawings:

Fig. 1 is a vertical sectional elevation on the line A—B of Fig. 5 of a motor equipped with my improved gap-sleeve;

Figs. 2, 3 and 4 are vertical sectional elevations of different motors showing modifications of the gap-sleeve and corresponding motor arrangements; and Fig. 5 is a horizontal section on the line C—D of Fig. 4.

Referring to the drawing wherein like characters of reference indicate like parts, the motor shown in Fig. 1, which is the preferred modification for motors of small size, consists of a stator 1 and a rotor 2 with the interposed gap-sleeve 3 which is mounted in gas- or liquid-tight connection with the packet of stator laminae 1 or with the casing 4 of the motor, the stator winding 12 being enclosed on all sides and protected against influence of the surrounding external fluid. The gap-sleeve 3 is composed of a mixture of finely divided magnetic material, as for instance iron powder, cast-iron powder or the like and a suitable binder as cement, bakelite, artificial resin or the like. In accordance with the nature of the mixture, the material is condensed by pressure or by chemical or thermal influence according to processes and methods adapted to the respective mixture, so as to form a compact and solid body, and the material is hardened as may be required in the special case. The gap-sleeve 3 is preferably made integral with the bearing bracket 5 which is tightly fitted to the casing 4 or to the stator packet 1. The opposite bearing bracket 6 is preferably separately made and tightly joined to the gap-sleeve and to the casing in order to avoid difficulties in winding the stator. Into one of the bearing brackets 5, 6 or front covers of the motor, the connecting cable 15 is tightly inserted. The frontal part 6 is sufficiently yielding to allow for expansion by heat. The front chambers 18 may be filled by way of the opening 19 with an insulating compound which will be referred to hereinafter.

Fig. 2 shows a modification adapted for motors of larger size. The stator 1 and the rotor 2 are separated by the interposed gap-sleeve 3 which is mounted in a liquid-tight connection with the casing 4 of the motor. The end portions 8 and 11 of the gap-sleeve, are in the form of integrally formed flanges which are sufficiently yielding to allow for expansion caused by heat. In the form illustrated in Fig. 2, the binder component of the mixture of the gap-sleeve is composed of a substance similar to rubber and may be manufactured with the flange 11 in connection with the stator or, as shown in Fig. 3 with a flange 9 separated from the latter. In the modification shown in Fig. 3, expansion is allowed for by a resilient packing 10 made of rubber or the like. The whole gap-sleeve is hardened departing from a semi-manufactured yielding state in its position on the stator after the latter has been wound, a sort of hard rubber being the result.

Fig. 4 illustrates a modification adapted for motors with considerable longitudinal extension, and in which the gap-sleeve is mounted in watertight connection with the remaining parts of the enclosure.

The mechanical strength of the gap-sleeve may be increased by admixing fibrous substances and enlarging the sleeve at the front or end parts. As the gap-sleeve is sufficiently strong in itself, it may be connected directly with a bearing bracket as shown at the upper end of Fig. 4, or with an end cover plate 14 in a liquid-tight manner and mounted on the stator later as shown at the lower end of Fig. 4. The other end then is tightly connected with the remaining parts of the enclosure. The bearing bracket 7 and the end cover 14 are sufficiently yieldable to compensate for heat expansion.

Motors provided with gap-sleeves are subjected to considerable slot-leakage. To avoid this, the gap-sleeve is made with varying iron percentage, as show Figs. 1, 4 and 5 (on the right-hand side in these figures) in such a manner, that the magnetic resistance of the leakage paths is increased by providing parts or strips 16 containing few iron particles.

A gap-sleeve having spaced intervals, in which there is finely divided magnetic material and other spaced intervals free from magnetic material, may be manufactured for instance by making a sleeve, of a mixture of a binder with asbestos or with a similar substance free from iron, by pressing it in a known manner, then, preferably in a semi-finished state, eliminating certain portions of this sleeve where magnetic permeability is needed, for instance such as longitudinal strips opposite the teeth of the stator by pressing out or punching or perforating in any suitable manner, and by filling the openings or slots by impressing a mixture of magnetic material with a binder, preferably with a high percentage of magnetic material and with a small quantity of the binder, so that the openings will be closed and the original shape of the sleeve again obtained. In a modification of this method of manufacturing, the sleeve is pressed from iron free material originally with longitudinal openings or slots or otherwise shaped as it may be required by the actual purpose, and the openings afterwards are closed by impressing magnetic material with a binder. It should be understood that for pressing out or punching the openings and for impressing the substituting filling substance suitable cores, moulds, punching and pressing tools should be employed.

The gap-sleeve may be made with ribs projecting into the openings of the slots, whereby the mechanical strength is increased and coil winding is made easier. The admixture of iron is shown in Figs. 4 and 5 by different dotting. As the parts 16 of the gap-sleeve 3 situated opposite the openings of the slots are free of iron or at least containing much less of it over their whole length than parts 17, the magnetic field is transmitted more readily to the rotor and magnetic leakage thereby is reduced. The described motor, having in fact closed slots, shows all the distinctive features of the motors with open slots. It is therefore possible to design the gap-sleeve considerably thicker than it has been made, up to now in known types of motors. This fact moreover permits of fitting the gap-sleeve with a thread 20 or the like and in consequence follows a simplified tightening.

As may be seen from Figs. 1, 2, 3 and 4, no, or practically no magnetic material is arranged in the gap-sleeve where it extends outside of the stator bore. The coil-head leakage-flux which otherwise would establish itself as a considerable but useless magnetic field with additional losses within the gap-sleeve is reduced to the same value which it usually has in normal motors of the standard type.

The front or end chambers 18 may be filled by way of the opening 19 with an insulating compound, paraffin or the like in a liquid state and the insulation of the conductors within the slots thereby is improved. Part of the chamber remains filled with air permitting expansion by heat.

The motor is preferably made with semi-open slots in order to obtain cheaper winding. The gap-sleeve is to be inserted after winding or may be made on the motor itself. As the jointing parts are manufactured and tested by mechanical means the invention permits of the manufacture of very cheap and reliable motors for refrigerating plants and of motors working submerged in a liquid and for similar purposes.

What I claim is:—

1. An electric motor comprising a stator and its winding both enclosed within a casing closed on all sides, the casing forming a hollow space for the rotor, a rotor of the induction or squirrel-cage type, bearing means for the rotor and a gap-sleeve, the gap-sleeve being composed of a mixture of finely divided magnetic material and a binder.

2. An electric motor comprising a stator and its winding both enclosed within a casing closed on all sides, the casing forming a hollow space for the rotor, a rotor of the induction or squirrel-cage type, bearing means for the rotor and a gap-sleeve, the gap-sleeve being composed of a mixture of finely divided magnetic material and a binder, and wherein the percentage of the magnetic material of the gap-sleeve is greater opposite the teeth of the iron core whereas this percentage is smaller in front of the slots.

3. An electric motor comprising a stator and its winding both enclosed within a casing closed on all sides, the casing forming a hollow space for the rotor, a rotor of the induction or squirrel-cage type, bearing means for the rotor and a gap-sleeve, the gap-sleeve being composed of a mixture of finely divided magnetic material and a binder, and wherein the percentage of magnetic material of the gap-sleeve is varying over its length.

4. An electric motor comprising a stator and its winding both enclosed within a casing closed on all sides, the casing forming a hollow space for the rotor, a rotor of the induction or squirrel-cage type, bearing means for the rotor and a gap-sleeve, the gap-sleeve being composed of a mixture of finely divided magnetic material and a binder, and wherein the percentage of magnetic material of the gap-sleeve is greater opposite the teeth of the iron core whereas this percentage is smaller in front of the slots and is varying over the length of the gap-sleeve.

5. An electric motor comprising a stator and its winding both enclosed within a casing closed on all sides, the casing forming a hollow space for the rotor, a rotor of the induction or squirrel-cage type, bearing means for the rotor and a gap-sleeve composed of a mixture of finely divided magnetic material and a binder, this gap-sleeve being enlarged to form a flange covering the coil-heads at the one front-side of the iron core.

6. An electric motor comprising a stator and its winding both enclosed within a casing closed on all sides, the casing forming a hollow space for the rotor, a rotor of the induction or squirrel-cage type, bearing means for the rotor and a gap-sleeve composed of a mixture of finely divided magnetic material and a binder, this gap-sleeve being enlarged on both sides to form yielding flanges covering the coil-heads on both front-sides of the iron core.

7. An electric motor comprising a stator and its winding both enclosed within a casing closed on all sides, the casing forming a hollow space for the rotor, a rotor of the induction or squirrel-cage type, bearing means for the rotor and a gap-sleeve composed of a mixture of finely divided magnetic material and a binder and wherein one front shield of the motor fitted with bearing means is made integral with the gap-sleeve.

8. An electric motor according to claim 2, the gap-sleeve being enlarged to form a flange covering the coil heads at the one front side of the iron core.

9. An electric motor according to claim 2, the gap-sleeve being enlarged on both sides to form yielding flanges covering the coil-heads on both front-sides of the iron core.

10. An electric motor according to claim 2, wherein one front shield of the motor being fitted with bearing means is made integral with the gap-sleeve.

11. An electric motor according to claim 3, the gap-sleeve being enlarged to form a flange covering the coil-heads at the one front-side of the iron core.

12. An electric motor according to claim 3, the gap-sleeve being enlarged on both sides to form yielding flanges covering the coil-heads on both front-sides of the iron core.

13. An electric motor according to claim 3, wherein one front shield of the motor fitted with bearing means is made integral with the gap-sleeve.

14. An electric motor according to claim 4, the gap-sleeve being enlarged to form a flange covering the coil-head at the one front-side of the iron core.

15. An electric motor according to claim 4, the gap-sleeve being enlarged on both sides to form yielding flanges covering the coil-heads on both front-sides of the iron core.

16. An electric motor according to claim 4, wherein one front shield of the motor fitted with bearing means, is made integral with the gap-sleeve.

MICHAEL SURJANINOFF.